US012773800B2

(12) United States Patent
Wonderley et al.

(10) Patent No.: US 12,773,800 B2
(45) Date of Patent: Oct. 27, 2026

(54) HAIR TRIMMER WITH PIVOTAL HEAD, AND LOCKING MECHANISM THEREFOR

(71) Applicant: Edgewell Personal Care Brands, LLC, Chesterfield, MO (US)

(72) Inventors: Jeffrey Wonderley, Fort Defiance, VA (US); Paul Dansreau, Shelton, CT (US)

(73) Assignee: Edgewell Personal Care Brands, LLC, Chesterfield, MO (US)

( * ) Notice: Subject to any disclaimer, the term of this patent is extended or adjusted under 35 U.S.C. 154(b) by 133 days.

(21) Appl. No.: 18/836,828

(22) PCT Filed: Feb. 13, 2023

(86) PCT No.: PCT/US2023/062455

§ 371 (c)(1),
(2) Date: Aug. 8, 2024

(87) PCT Pub. No.: WO2023/164376

PCT Pub. Date: Aug. 31, 2023

(65) Prior Publication Data

US 2025/0144829 A1 May 8, 2025

Related U.S. Application Data

(60) Provisional application No. 63/313,783, filed on Feb. 25, 2022.

(51) Int. Cl.
*B26B 19/06* (2006.01)

(52) U.S. Cl.
CPC .................................. *B26B 19/063* (2013.01)

(58) Field of Classification Search
None
See application file for complete search history.

(56) References Cited

U.S. PATENT DOCUMENTS

| | | | | |
|---|---|---|---|---|
| 1,997,096 A | | 4/1935 | Andis | |
| 4,581,822 A | * | 4/1986 | Fujimura | B26B 19/3846 30/220 |

(Continued)

FOREIGN PATENT DOCUMENTS

| | | | |
|---|---|---|---|
| CN | 104647416 A | 5/2015 | |
| FR | 1099084 A1 | 8/1955 | |

OTHER PUBLICATIONS

International Search Report and Written Opinion mailed Sep. 6, 2023 in International Application No. PCT/US2023/062455.

(Continued)

*Primary Examiner* — Hwei-Siu C Payer
(74) *Attorney, Agent, or Firm* — Edgar Rodriguez

(57) ABSTRACT

A powered hair trimmer has a fixed and moving toothed blade arrangement supported in a pivotal head that is pivotal relative to the housing of the handle of the device, about an axis extending in the direction of reciprocal movement of the moving blade. The pivotal head is pivotal through a series of predetermined positions (e.g. 6 positions) and is retained in any one position by a spring-biased detent. A manually operable locking button acts to lock the pivotal head in any one pivotal position such that the pivotal head cannot be accidentally pivoted during use. The locking button is slidable between a first locked and a second unlocked position and is spring biased to the locked position. A unitary compound biasing element provides both of the bias force for the locking button, and the bias force for the detent.

18 Claims, 9 Drawing Sheets

(56) References Cited

U.S. PATENT DOCUMENTS

| | | | | |
|---|---|---|---|---|
| 6,502,312 | B2 * | 1/2003 | Beutel | B26B 19/063 30/216 |
| 6,505,404 | B2 * | 1/2003 | Ullmann | B26B 19/063 30/223 |
| 2002/0000043 | A1 | 1/2002 | Beutel et al. | |
| 2014/0338198 | A1 * | 11/2014 | Frazer | B26B 1/042 30/161 |
| 2017/0163137 | A1 * | 6/2017 | Posselt | H02K 17/30 |
| 2021/0291389 | A1 | 9/2021 | Buck | |
| 2025/0144829 | A1 * | 5/2025 | Wonderley | B26B 19/063 |

OTHER PUBLICATIONS

Communication pursuant to Article 94(3) EPC dated Jul. 2, 2025, issued by the European Patent Office in European Patent Application No. 23 710 616.6.

International Preliminary Report on Patentability issued Aug. 27, 2024 in International Application No. PCT/US2023/062455.

Unofficial English translation of First Office Action received from the Chinese National Intellectual Property Administration dated May 10, 2026, in Chinese Patent Application No. 2023800225197.

* cited by examiner

HAIR TRIMMER WITH PIVOTAL HEAD, AND LOCKING MECHANISM THEREFOR

CROSS-REFERENCE TO RELATED APPLICATIONS

This application claims priority to International Application No. PCT/US2023/062455, filed on Feb. 13, 2023, which claims priority to U.S. Provisional Patent Application No. 63/313,783, filed Feb. 25, 2022, the contents of which are incorporated herein by reference in their entirety.

BACKGROUND

1. Technical Field

The present disclosure relates to hair trimmers in general and, more particularly, to a hair trimmer with a pivotal head, and a locking mechanism for the same.

2. Background

For ergonomic benefits when removing hair from divers body parts, there have been proposals in the patent literature for hair trimmers (e.g. having a fixed and moving toothed blade arrangement) to have their heads bearing the blade arrangement pivotal relative to the handle of the device, about an axis extending generally parallel to the direction of reciprocal movement of the moving blade, e.g. laterally relative to the handle. Examples are disclosed in U.S. Pat. Nos. 511,966 and 1,997,096. The devices of these documents are infinitely adjustable over the extent of pivotal movement of their respective heads, i.e. the head does not have a series of predetermined pivotal positions over its range of movement. The head of the '096 device in particular is retained in its desired pivoted position by frictional effects of a friction plunger (element 44 therein). On the other hand, the devices of French patent application number 1,099,084A and U.S. patent application publication 2021/0291389 both include predetermined pivotal positions, with the head being retained in any one desired position by a spring biased detent. However, use of a spring biased detent presents a conundrum for the designer of the hair trimmer. On one hand the torque required to be applied by a user of the device, to operate the detent to pivot the head away from any detented pivotal position should be sufficiently low that the head can be readily manually pivoted, while on the other hand the required torque should be sufficiently high to prevent unintentional accidental pivotal movement of the head during use, that might result in nicks and cuts for the user.

SUMMARY

The present disclosure has for its objective to substantially alleviate the limitations of the prior art hair trimmers by providing an improved pivotal head hair trimmer, the hair trimmer having a releasable locking mechanism for its pivotal head. The hair trimmer has a handle housing having a pivotal head pivotally mounted to the housing, and being pivotal about a pivot axis defined by axles of a housing of the pivotal head being received in journals of the handle housing. The head housing supports a fixed blade and a moving blade that is reciprocal relative to the fixed blade in a direction parallel to the pivot axis. The head housing has a plurality of grooves extending axially along an outer surface portion of the head housing and radially arranged around the pivot axis. A locking button is mounted to the handle housing and slidable along the handle housing in a length direction of the handle housing between a first position where pivoting of the pivotal head relative to the handle housing is locked, and a second "unlocked" position where the pivotal head is manually pivotal relative to the handle housing. The locking button is biased towards the first position. The locking button also has a depending wall and a cam surface. A detent has at opposed ends an engagement end and a cam end, and has a detent slot between the respective ends. The engagement end is receivable in any one groove to define a one predetermined pivotal position of the pivotal head relative to the handle housing. A biasing element includes an inner biasing portion that acts against the depending wall of the locking button to bias the locking button to the first position. The biasing element also has an outer biasing portion that is received in the detent slot to bias the engagement end of the detent in a direction into the respective groove. When the locking button is in the first position, the cam surface of the locking button abuts the cam end of the detent to retain the engagement end of the detent in any one groove of the head housing to lock pivotal movement of the pivotal head. When the locking button is in the second position, the cam surface of the locking button is retracted relative to the cam end of the detent to permit the detent to move away from the head housing to release the engagement end of the detent from the any one groove, thereby permitting the pivotal head to be pivoted relative to the handle housing In some aspects the locking button can have mirrored legs that respectively snap fittingly engage elongated slots of the handle housing to retain the locking button to the housing. The housing slots are elongated along a general length direction of the handle housing to allow the locking button to be slidable in the handle housing length direction.

In some aspects the plurality of grooves can be equally disposed radially around the pivot axis. The plurality of grooves can comprise six grooves. In further aspects, the plurality of grooves can be a plurality of primary detent grooves and the head housing of the pivotal head can also include a plurality of secondary detent grooves.

In some aspects the biasing element can be a compound leaf spring having a bifurcated inner leaf secured within a bifurcated outer leaf. The bifurcated inner leaf has an inner base portion and the inner biasing portion. The bifurcated outer leaf has an outer base portion and the outer biasing portion. The inner base portion of the bifurcated inner leaf overlays the outer base portion of the bifurcated outer leaf to provide in combination a trifurcated form for the biasing element. The biasing element can be snap-fittingly secured within the handle housing by a protrusion of a support wall of the handle housing engaging an elongated slot of the outer base portion of the biasing element. In further aspects, the outer biasing portion of the biasing element can be provided one or more cantilever arms at lateral outer portions of the outer biasing portion. The cantilever arms are respectively engaged by elevation surfaces of the locking button such that the detent can be lifted (elevated) from its groove when the locking button is moved from the first locked position to the second unlocked position.

Another aspect of the present disclosure lies in a biasing element for a hair trimmer. The biasing element is a compound leaf spring having a bifurcated inner leaf secured within a bifurcated outer leaf. The bifurcated inner leaf has an inner base portion and an inner biasing portion. The bifurcated outer leaf has an outer base portion and an outer biasing portion. In its assembled condition the base portion of the inner leaf overlays the base portion of the outer leaf to provide in combination a trifurcated form for the biasing element. The inner biasing portion is adapted to engage a locking button of the hair trimmer to provide a biasing force for the locking button. The outer biasing portion is adapted to engage a detent of the hair trimmer to provide a biasing force for the detent that can be the same or different to the biasing force of the locking button. In further aspects, the outer biasing portion of the biasing element is provided one or more cantilever arms at lateral outer portions of the outer biasing portion. The cantilever arms are adapted to be engaged by elevation surfaces of the locking button.

In some aspects the inner leaf of the biasing element has a protrusion that snap-fittingly engages an opening of the outer leaf to secure the inner leaf within the outer leaf.

In some aspects, both of the inner leaf and the outer leaf are made from a sheet material, e.g. stainless steel, and the inner leaf has a different thickness e.g. 0.2 mm than the outer leaf, e.g. 0.3 mm.

The pivotal head of the hair trimmer can be readily manually pivoted between predetermined pivotal positions when the locking button is in an unlocked (second) position. When the locking button is in the locked (first) position the pivotal head is locked and cannot be accidentally pivoted during use. The locking button is biased to its locked position so that the hair trimmer cannot be accidentally unlocked, and the pivotal head cannot be accidentally pivoted during use. The above features and these and other advantages will be more fully understood with reference to the following detailed description when taken in conjunction with the accompanying drawings.

DETAILED DESCRIPTION

Figure 1:
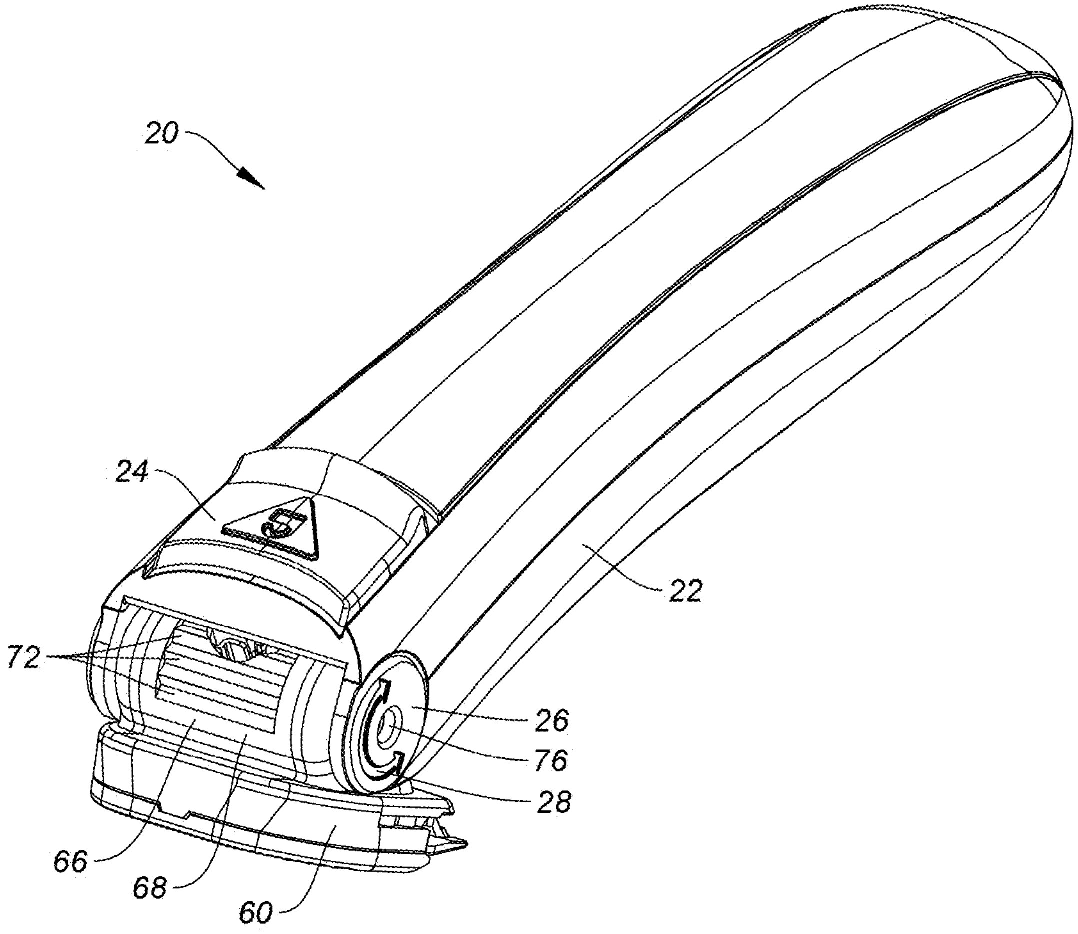
FIG. 1 is an upper perspective view of a hair trimmer of the present disclosure.
Figure 2:
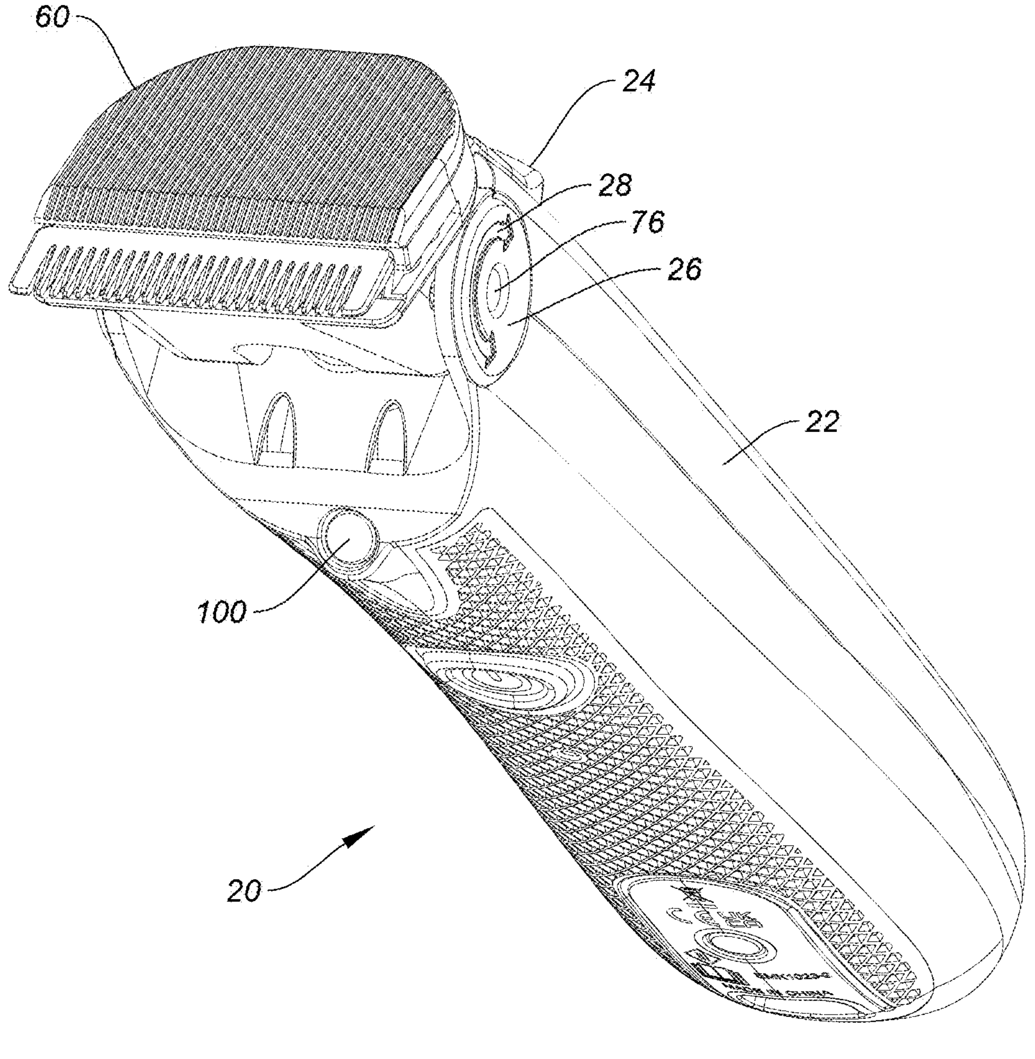
FIG. 2 is a lower perspective view of the hair trimmer.

Referring now to the drawings, and in particular FIGS. 1 and 2, a powered hair trimmer 20 is depicted. The hair trimmer 20 includes a handle housing 22 adapted to be gripped by a user for operation of the hair trimmer 20, and further encasing drive elements of the hair trimmer 20. For benefits of manufacture and assembly, the handle housing 22 can be a single component part, or multiple (e.g. two) parts joined together. The hair trimmer 20 also has a locking button 24 snap fitted to, and slidable along the handle housing 22 (see FIGS. 4-5). The handle housing 22 has a circular region 26 on both lateral sides of the housing 22 having a double ended arrow icon 28 to indicate to a user that the pivotal head 60 bearing the blade arrangement is capable of being pivoted relative to the housing 22. In FIG. 2 an illuminating element 100 is shown. The illuminating element 100 provides illumination to the user's skin surface in the vicinity of the cutting region of fixed and moving blades 62, 64 (see FIGS. 4-6). The illuminating element 100 can include a light pipe (see FIGS. 4-6) transmitting light from a PCB-mounted LED within the housing 22.

Figure 3:
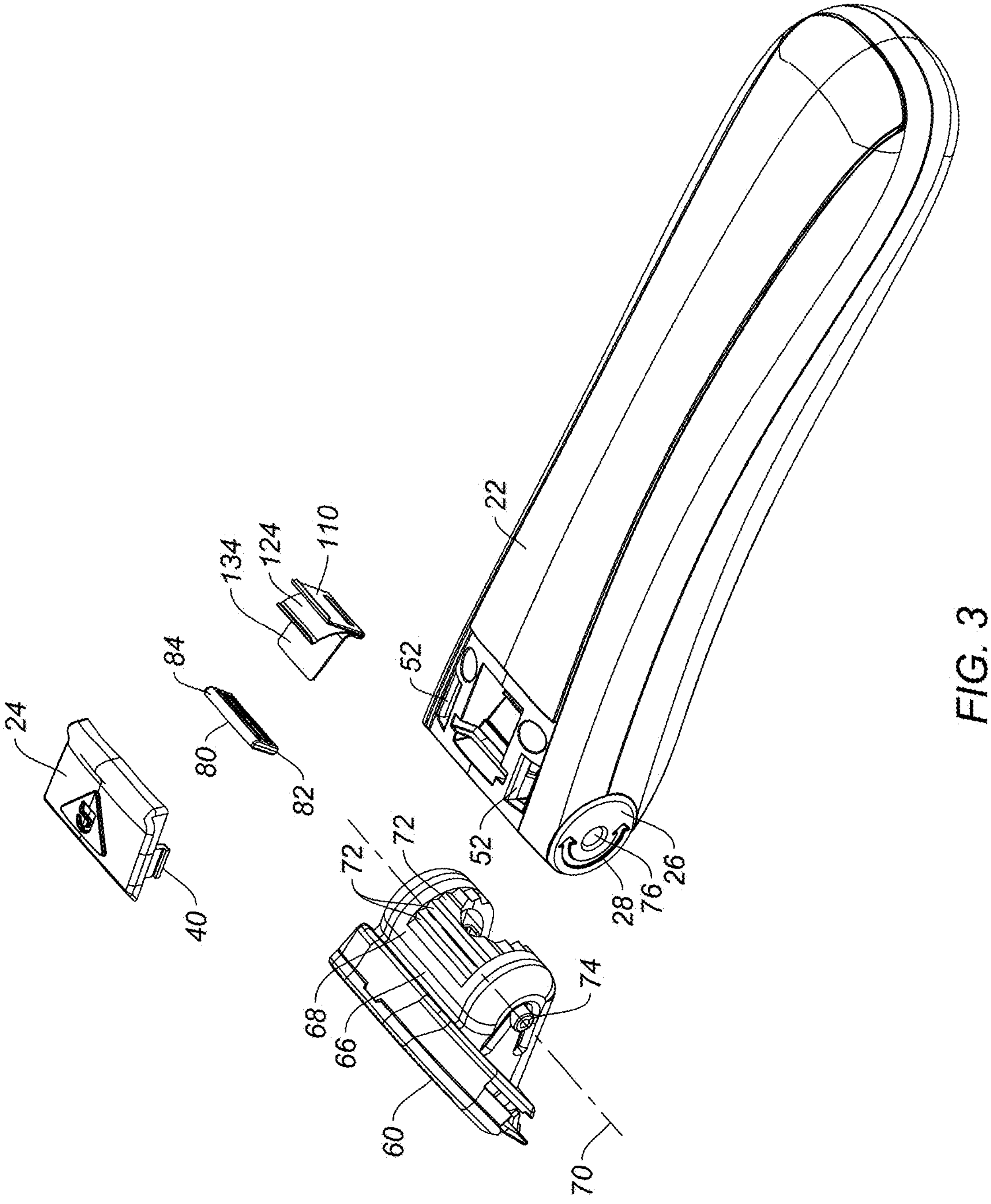
FIG. 3 is an exploded perspective view of the hair trimmer.

Referring additionally to FIG. 3, an exploded perspective view showing the primary elements for the pivotal function of the hair trimmer 20 are depicted. As above, the hair trimmer 20 has a handle housing 22. Locking button 24 snap fits to the housing 22 and is slidable therealong. The locking button 24 has mirrored legs 40 (only one of two legs 40 can be seen in this view) that respectively snap fittingly engage elongated slots 52 of the handle housing 22 to retain the locking button 24 to the housing 22. The housing slots 52 are elongated along a general length direction of the handle housing 22 to allow the locking button 24 to be slidable in that direction. The hair trimmer 20 includes a pivotal head 60 containing the fixed blade 62 and moving blade 64 (see FIGS. 4-6) mounted to a head housing 66. The head housing 66 defines a pivot axis 70 about which the head 60 is pivotal relative to the handle housing 22. The head housing 66 includes a series of detent grooves 72 arranged circumferentially around a portion of the outer surface 68 of the head housing 66. In a first embodiment of the hair trimmer 20, in transverse cross section (see FIG. 6A) the detent grooves 72 are preferably a shallow "V" shape, having an included angle e.g. about 120 degrees, however other shapes such as a shallow "U" can be used. The outer surface portion 68 is preferably parti-cylindrical but can be e.g. parti-barrel-shaped. The detent grooves 72 extend axially along the outer surface portion 68. The head housing 66 has opposed axles 74, coaxial with axis 70 that are received in respective journals 76 of the handle housing 22 to permit pivotal movement of the pivotal head 60 relative to the handle housing 22. Detent 80 has an engagement end 82 that engages any one of the detent grooves 72 to define a pivotal position for the head 60. In transverse cross section (see FIG. 6A) the shape of the engagement end 82 is preferably complementary to the detent groove 72 in which it engages.

Figure 4:
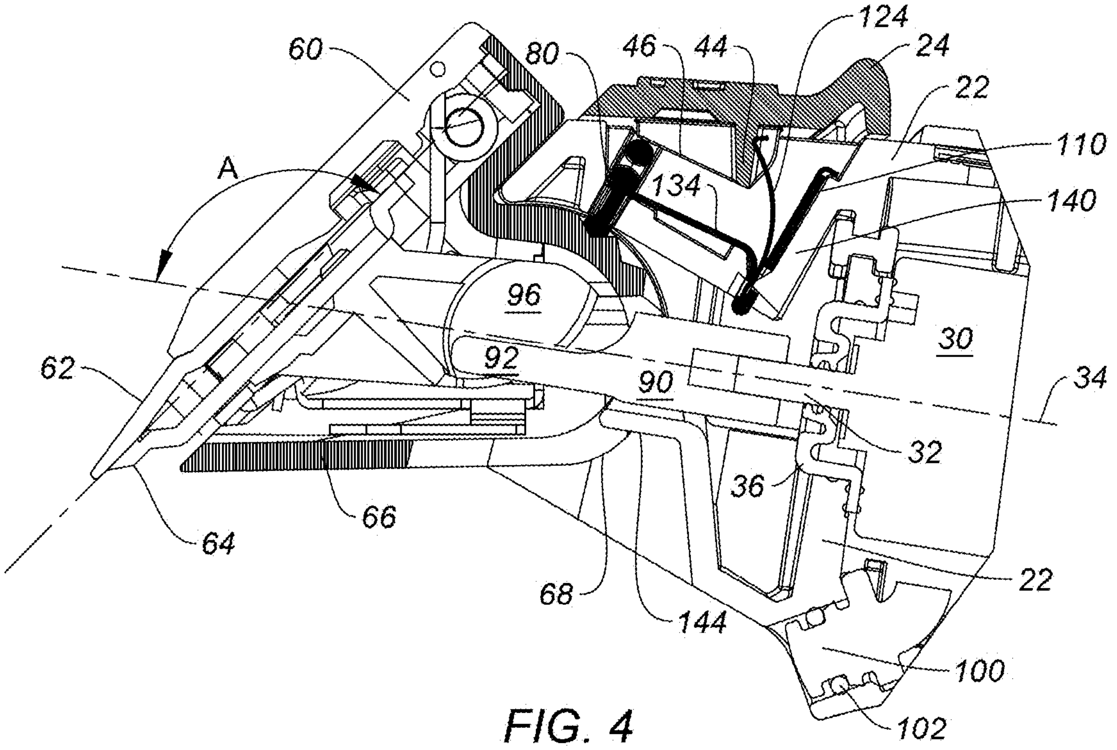
FIG. 4 is a partial longitudinal sectional view of the hair trimmer.
Figure 5:
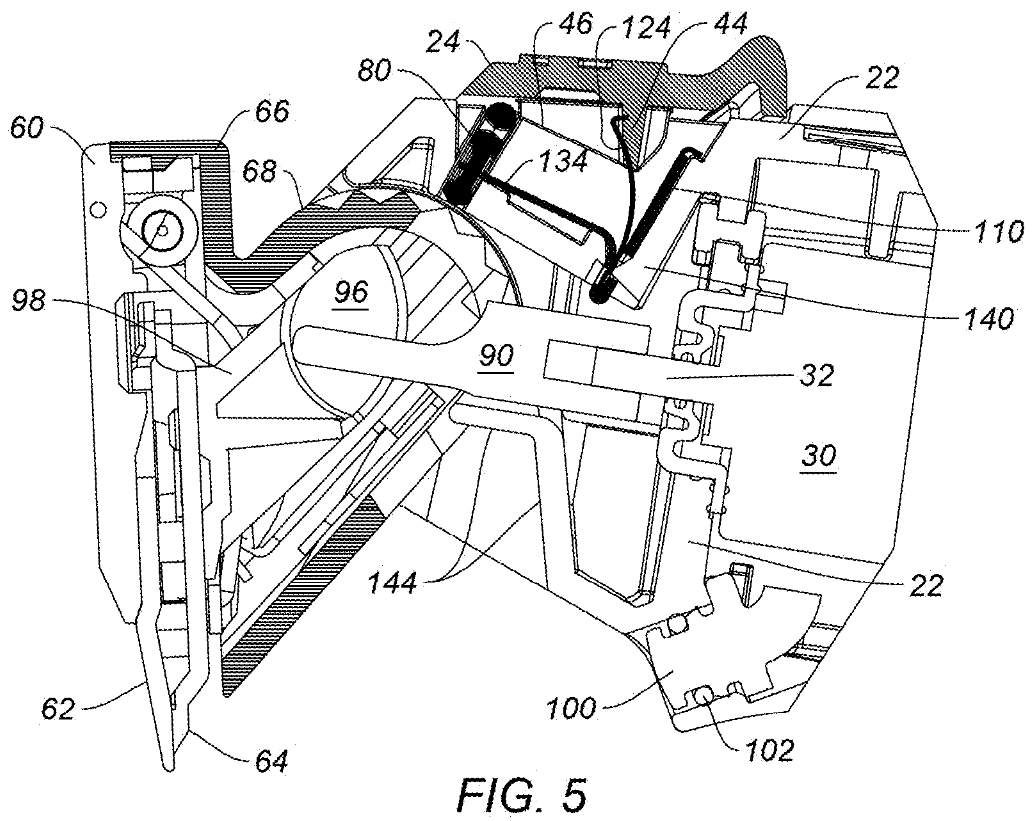
FIG. 5 is a partial longitudinal sectional view of the hair trimmer with the blade arrangement in another position in comparison to FIG. 4.
Figure 6:
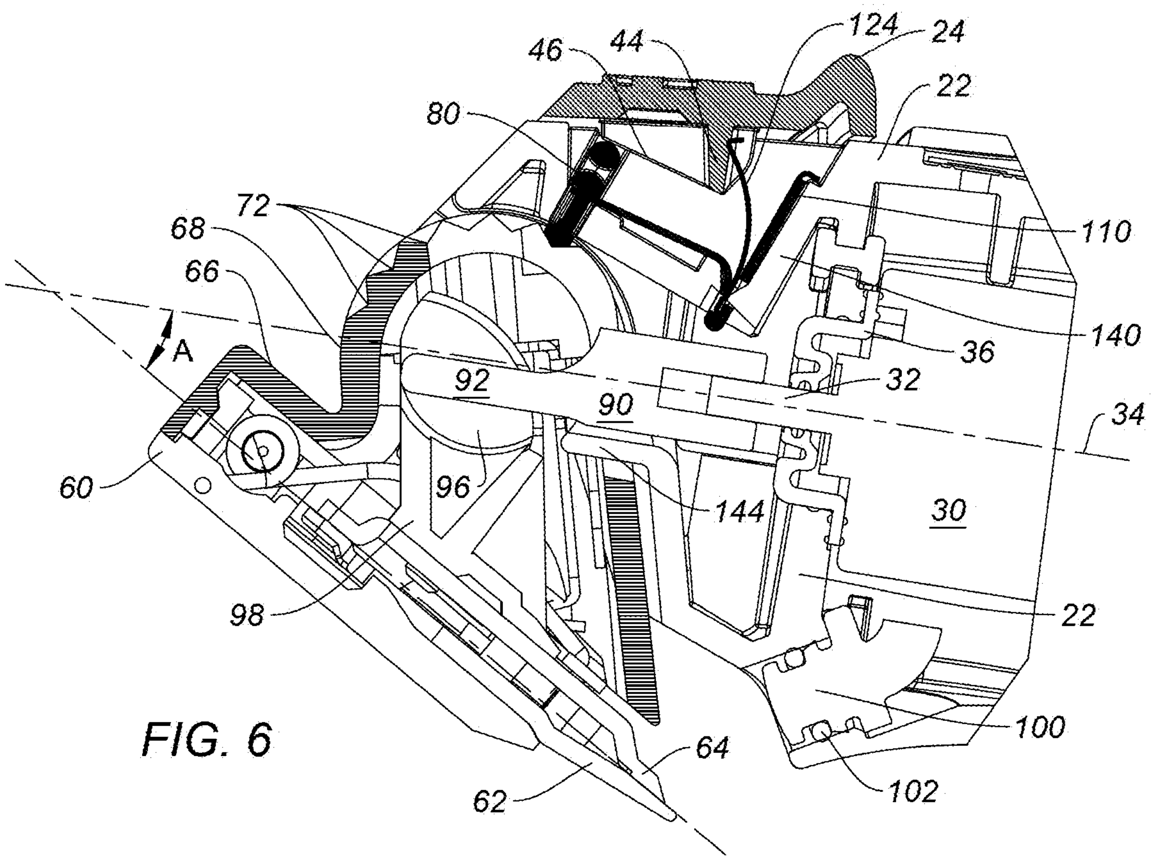
FIG. 6 is a partial longitudinal sectional view of the hair trimmer with the blade arrangement in a further comparative position.
Figure 6A:
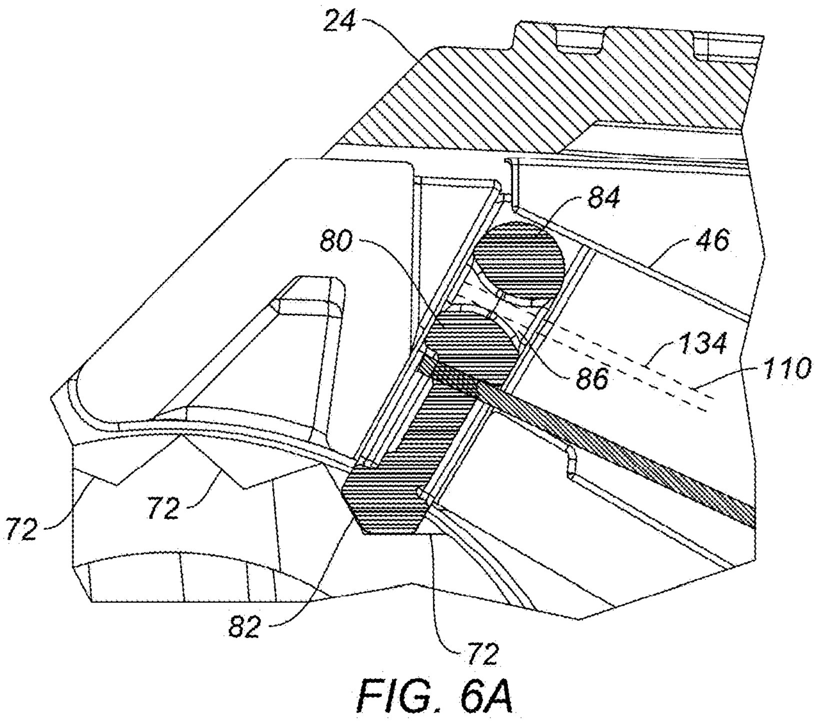
FIG. 6A is a detailed view of a portion of FIG. 6.

Referring additionally to FIGS. 4-6, partial longitudinal sectional views of the hair trimmer 20 in the region of the pivotal arrangement of the pivotal head 60 are shown. FIGS. 4 and 6 in particular show the pivotal head 60 pivoted to predetermined (detented) positions at the extreme ends of its range of movement. FIG. 5 shows an intermediate pivotal position, between predetermined (detented) positions. FIG. 6A is a detailed view of a portion of FIG. 6.

The handle housing 22 contains a motor 30 in a cavity of the handle housing 22 to reciprocally drive the moving blade 64 relative to the fixed blade 62 in a direction generally parallel to axis 70. The motor 30 is preferably a rotary motor but a linear reciprocating motor can be used. The motor 30 has an output shaft 32. The motor 30 is preferably mounted in the housing facing generally along the length of the housing 22. In this manner an axis 34 of the output shaft 32 provides a convenient reference axis for the handle housing 22, relative to which rotation of the pivotal head 60 can be specified. However, other convenient features can be employed to specify relative rotation of the pivotal head 60. The handle housing 22 also contains a battery or batteries (not shown) to power the motor 30. The batteries can be disposable or rechargeable, in which latter case the handle housing 22 can further contain a circuit board (PCB) and a suitable connector (both not shown) to an external power source to facilitate recharging the battery or batteries. The PCB can have mounted thereto a LED to provide illumination, as previously mentioned. The motor 30 can be provided with a seal 36 to prevent the ingress of water into the cavity of the handle housing 22. The illuminating element 100 in the form of a light pipe can be provide with an O-ring seal 102 for a similar function.

The motor output shaft 32 has an eccentric 90 mounted thereto. The eccentric 90 has an extension 92 received between opposed cheeks 96 of support 98 of the moving blade 64. Rotation of the output shaft 32 and thus the eccentric 90 provides reciprocating movement of the moving blade, in particular relative to the fixed blade 62, and in a direction laterally of the handle housing 22 generally parallel to pivot axis 70.

In the present example, in a first extreme pivoted position in FIG. 4 an angle A between the axis 34 of the motor output shaft 32 (the motor 30 being generally mounted along the handle housing 22) and a reference plane mutually between the fixed blade 62 and moving blade 64 is 126 degrees. In FIG. 6, at a second position at the extreme pivoted position at the opposed end of the pivotal range the angle A between the same references is 31 degrees. This example has a pivotal range of its pivotal head 60 relative to the motor shaft axis 34, and thus relative to the handle housing 22 of 95 degrees (126 degrees minus 31 degrees). As seen in any of FIGS. 4-6, the head housing 66 includes six detent grooves 72 that define in combination with detent 80 a plurality of predetermined detented positions for the pivotal head 60. In this example the detented positions are equally spaced, i.e. the pivotal movement of the pivotal head 60 is 19 degrees between adjacent positions. However, the present disclosure should not be limited to a particular number of predetermined detented positions, to a pivotal movement between adjacent positions, and to the positions of the pivotal head 60 at extreme ends of its pivotal range. The present disclosure should not be limited to equally spaced or unequally spaced detented positions.

In FIG. 4 the locking button 24 is shown in a first, locked position, i.e. to lock any pivotal movement of the pivotal head 60. The locking button 24 has a depending wall 44 against which the inner biasing portion 124 of the inner leaf 120 of the biasing element 110 acts to bias the locking button 24 to its locked position (see FIGS. 7-8 and later description for details of the biasing element 110). The locking button 24 is selectively manually moveable (slidable along the handle housing 22 along slots 52) to a second position shown in FIG. 5 wherein the pivotal head 60 is unlocked, and can be manually pivoted to another predetermined position. The locking button also includes cam surface 46 which in FIG. 4 in the locked position abuts or can be closely spaced from the cam end 84 of the detent 80 (see also FIG. 6A) to retain the engagement end 82 of the detent 80 in any desired detent groove 72 to lock pivotal movement of the pivotal head 60. In FIG. 5 in the unlocked position the cam surface 46 of the locking button 24 is retracted relative to the cam end 84 of the detent 80 to permit the detent 80 to be moved away from its locked position by engagement end 82 no longer being retained in its desired respective detent groove 72. The detent 80 is provided with a biasing force to bias the engagement end 82 in a direction into any detent groove 72 by outer biasing portion 134 of the outer leaf 130 of the biasing element 110 being received in detent slot 86 of the detent 80. It is important to note that, for the purposes of expediting the preparation of FIGS. 4-6 and 6A of the drawings of this application that the biasing element 110 is shown in its as-provided, as-manufactured condition. As depicted in these figures the respective biasing portions 124, 134 are not depicted to be correctly received by the respective wall 44 or slot 86 since some deflection of the respective biasing portion 124, 134 is required to provide a biasing pre-load. However, the skilled worker will understand how the biasing portions should be deflected. For example, in FIG. 6A the correct position for biasing portion 134 in detent slot 86 is additionally shown in dashed line.

Figure 4A:
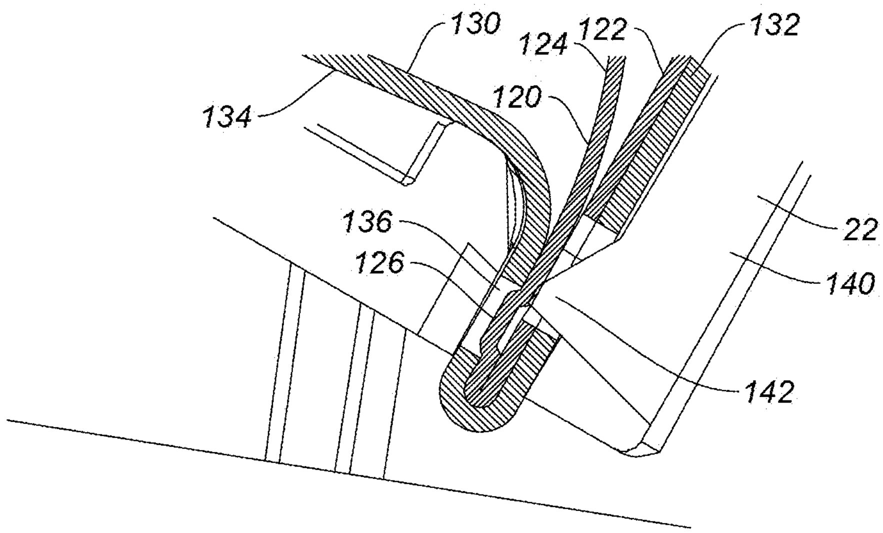
FIG. 4A is a detailed view of a portion of FIG. 4.
Figure 7:
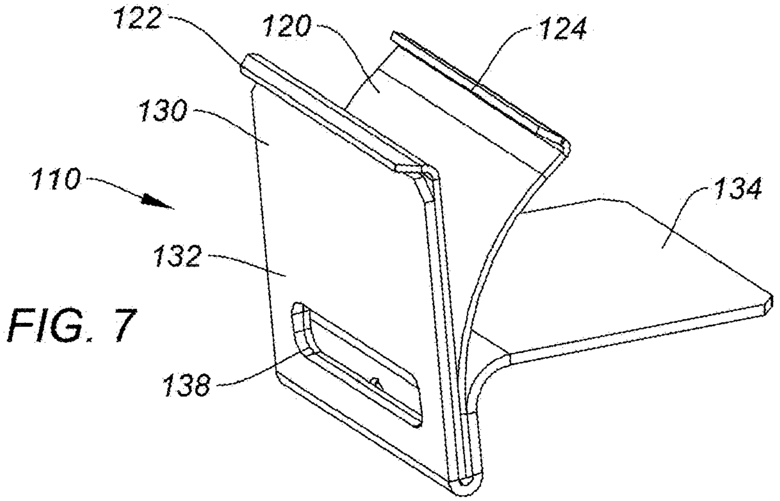
FIGS. 7-8 are perspective views of a biasing element of the hair trimmer.
Figure 8:
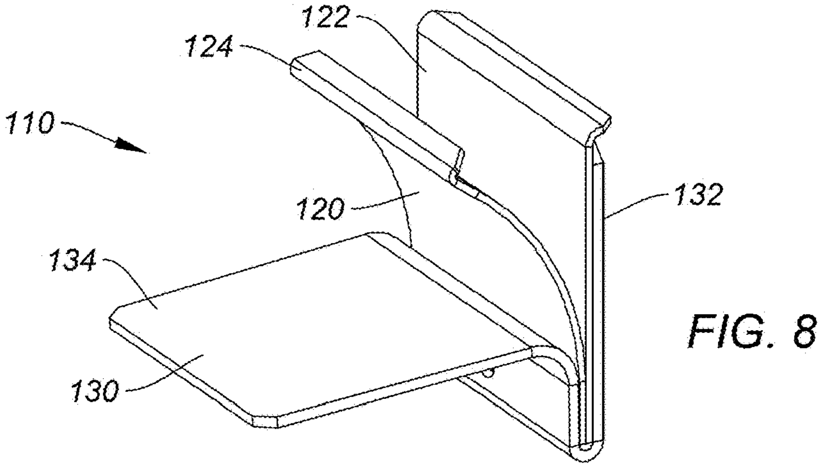

Referring additionally to FIGS. 7 and 8, perspective views of the biasing element 110 are shown. As depicted, the biasing element 110 comprises a compound leaf spring having a bifurcated inner leaf 120 secured within a bifurcated outer leaf 130 to provide in combination a trifurcated form. The bifurcated inner leaf 120 has an inner base portion 122, and an inner biasing portion 124 that engages the locking button 24 to provide the biasing force therefor. The bifurcated outer leaf 130 has an outer base portion 132, and an outer biasing portion 134 that engages the detent 80 to provide the biasing force therefor. In the assembled condition of the hair trimmer, the base portion 122 of the inner leaf 120 overlays the base portion 132 of the outer leaf 130, which in turn overlays a support wall 140 of the housing 22 to react the respective biasing forces of the biasing portions 124, 134. The biasing forces applied by the biasing portions 124, 134 to their respective elements 24, 80 are not necessarily identical. Referring additionally to FIG. 4A, the inner leaf 120 can be snap fitted within the outer leaf 130. The inner leaf 120 can be provided with a protrusion 126 that snap-fittingly engages an opening 136 of the outer leaf 130. The inner leaf 120 can also be secured within the outer leaf 130 e.g. by spot welding or by a suitable adhesive, or by the outer leaf 130 being crimped or otherwise permanently formed around the inner leaf 120 to frictionally secure the inner leaf 120. The outer leaf 130 is also provided with an elongated slot 138 to snap fittingly engage a protrusion 142 of the support wall 140 of the handle housing 22 to secure the assembled biasing element 110 to the housing 22. Both of the inner leaf 120 and outer leaf 130 are preferably made from perforated forms from austenitic stainless steel sheet, e.g. from any of grades AISI 301/302/304 or DIN 1.4310, or from any other suitable material. For the benefits of providing the desired respective biasing forces, the inner leaf 120 and the outer leaf 130 can have the same or different thicknesses. For example, the inner leaf 120 can be 0.2 mm thick and the outer leaf 130 can be 0.3 mm thick. The respective biasing forces for the detent 80 and locking button 24 can also be provided by other means, such as two individual springs, e.g. two individual compression spring.

In FIGS. 4-6, handle housing 22 is also provided with an extension wall 144 that is partially disposed closely spaced from at least a major portion of the eccentric 90. This wall 144 prevents a user accidentally touching the eccentric 90 during operation of the hair trimmer 20.

Since detent grooves 72 are a shallow “V” and the engagement end 82 of the detent 80 is complementary, torque applied manually to the pivotal head 60 when the pivotal head is “unlocked” is sufficient to ‘cam’ the detent 80 away from the head housing 66 such that the pivotal head 60 can be pivoted to another position. FIG. 5 is representative of such an intermediate position. The peak torque required for a user to rotate the pivotal head 60 between detented positions is in a range about 100-200 mNm when the locking button 24 is in the unlocked position, i.e. the pivotal head 60 can be readily pivoted between predetermined positions. When the locking button 24 is in the locked position the pivotal head 60 is locked and cannot be accidentally pivoted during use. The locking button 24 is biased to its locked position so that the hair trimmer 20 cannot be accidentally unlocked and the pivotal head 60 accidentally pivoted during use.

Figure 9:
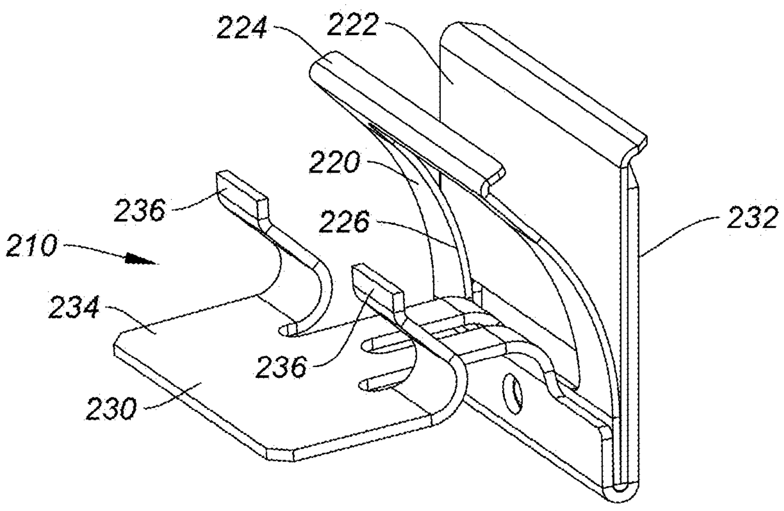
FIGS. 9-10 are perspective views of another biasing element of a further hair trimmer.
Figure 10:
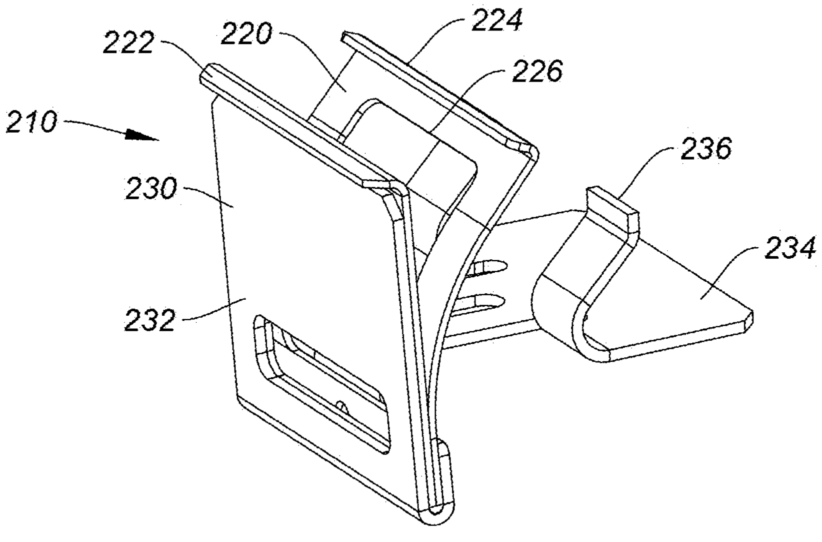

Referring now to FIGS. 9 and 10, perspective views of another biasing element 210 for a further hair trimmer are shown. Similarly to the biasing element 110 of FIGS. 7-8, biasing element 210 comprises a compound leaf spring having a bifurcated inner leaf 220 secured within a bifurcated outer leaf 230. The material(s), material condition, attachment method, and leaf thicknesses are also similar to those of the biasing element 110 of FIGS. 7-8. The bifurcated inner leaf 220 has an inner base portion 222, and an inner biasing portion 224 that engages the locking button 324 (see FIG. 11) to provide the biasing force therefor. The bifurcated outer leaf 230 has an outer base portion 232, and an outer biasing portion 234 that is received in a slot 286 of the detent 380 (see also FIG. 11) to provide the biasing force and elevation motion therefor (see later in the present disclosure). In the assembled condition of the hair trimmer, the base portion 222 of the inner leaf 220 overlays the base portion 232 of the outer leaf 230, which in turn overlays a support wall of the housing to react the respective biasing forces of the biasing portions 224, 234. The outer biasing portion 234 is further formed to provide one or more cantilever arms 236 at lateral outer portions thereof. The inner biasing portion 224 can also be provided with an opening 226 to (comparative to inner biasing portion 124 of biasing element 110) modify the biasing forces effected by this portion.

Figure 11:
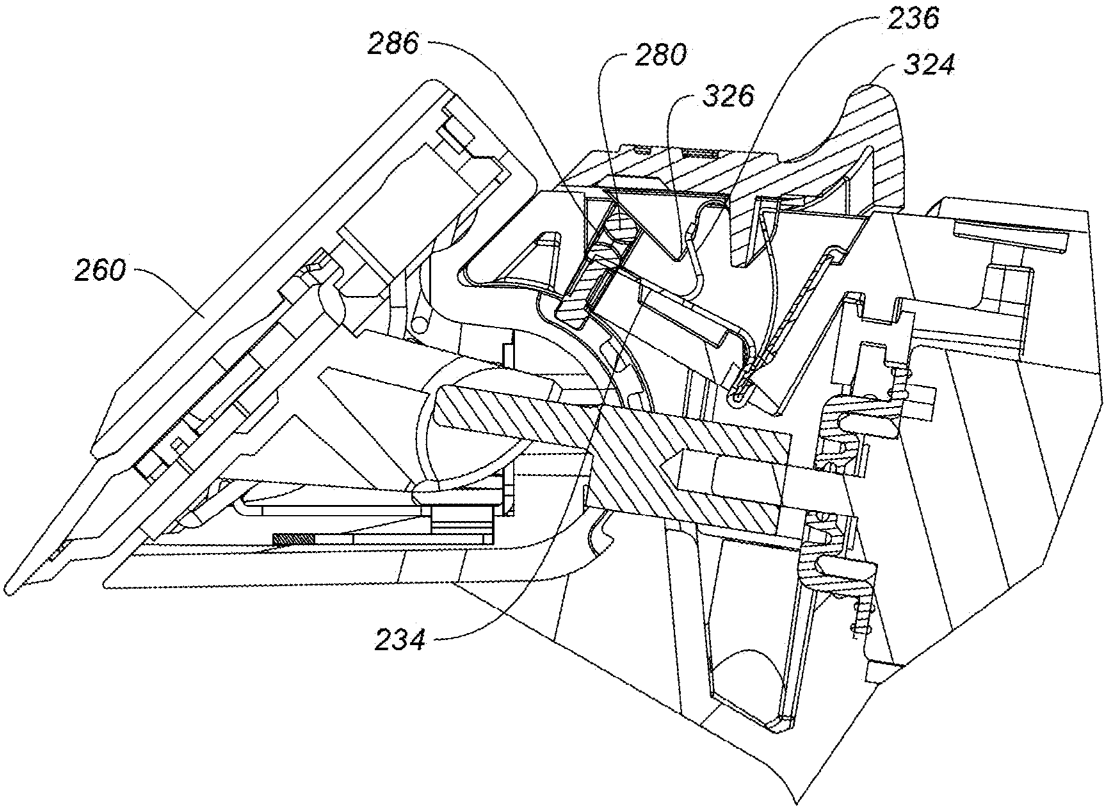
FIG. 11 is a partial longitudinal sectional view of the further hair trimmer, taken at a plane similar to that for FIG. 4.
Figure 12:
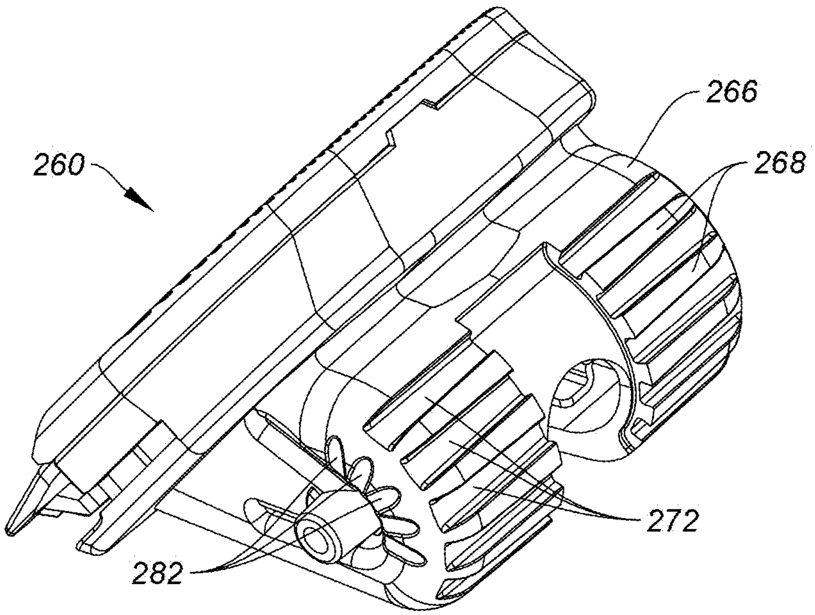
FIG. 12 is a perspective view of a pivotal head of the further hair trimmer.
Figure 13:
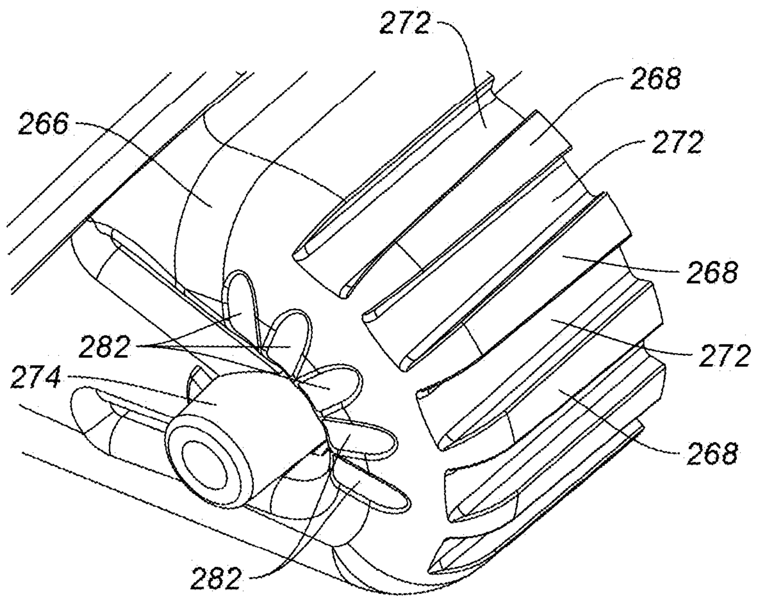
FIG. 13 is an enlarged portion of FIG. 12.
Figure 14:
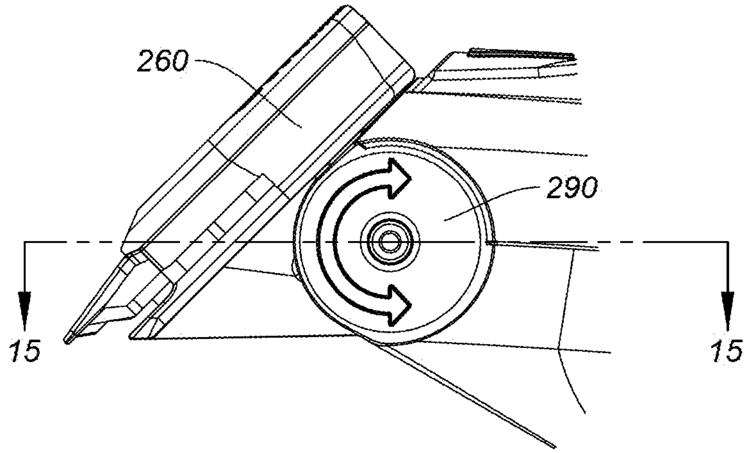
FIG. 14 is a partial side view of the pivotal head region of the further hair trimmer.

Referring now to FIGS. 11-13 a partial longitudinal sectional view of a further hair trimmer is shown in FIG. 11. FIGS. 12-13 show a pivotal head on its own, and an enlarged detailed view thereof. This hair trimmer is generally similar to that described earlier (e.g. see the description of FIG. 4) with principal exceptions. The pivotal head 260 includes a head housing 266 having a series of primary detent grooves 272 arranged circumferentially around a portion of the outer surface 268 of the head housing 266. The pivotal head 260 also has axle(s) 274 that are supported by journals of the handle housing of this hair trimmer. The primary detent grooves 272 are parallel sided. Any manually applied torque to the pivotal head 260 will now be unable to 'cam' a detent 280 (when the locking button 324 is in a second unlocked position-comparative to the button position of FIG. 5) away from the head housing 266 such that the pivotal head 260 could be pivoted to another position. The side walls of primary detent grooves 272 can also be at a narrow "V," i.e. at a small included angle between side walls. To elevate the detent 280 from any respective primary detent groove 272, the locking button 324 is provided with one or more elevation surfaces 326. The elevation surfaces 326 respectively engage the cantilever arms 236 of the biasing element 210. When the locking button 324 is selectively moved to the unlocked (second) position (comparative to the position of FIG. 5, or to the right relative to FIG. 11) the elevation surface's 326 engagement of a cantilever arm 236 causes the outer biasing portion 234 of the biasing element 210 to deflect clockwise relative to FIG. 11. Since the outer biasing portion 234 of the biasing element 210 is received in a detent slot 286 of the detent 280, this deflection of the outer biasing portion 234 lifts or elevates the detent 280 from its respective primary detent groove 272 permitting the pivotal head 260 to be manually pivoted to another position.

As mentioned earlier, as depicted in FIG. 11, the biasing portion 234 is not depicted to be correctly received by the detent slot 286 since some deflection of the respective biasing portion 234 is required to provide a biasing pre-load. However, the skilled worker will also understand how the biasing portion should be deflected to be correctly received.

Figure 15:
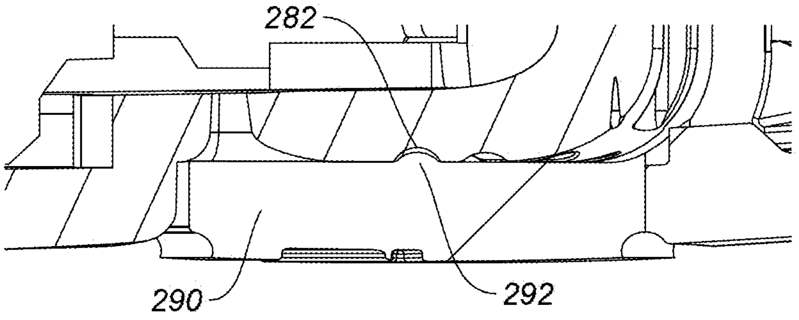
FIG. 15 is a sectional view of FIG. 14 taken at lines 15-15.

In this further hair trimmer, the (primary) detent grooves 272 are not a shallow "V" or "U" but parallel sided. A user might find difficulty identify a position of the pivotal head 260 where the detent 280 is aligned with and can readily engage a detent groove 272 such that the locking button 324 can be returned to its locked position. A so-called "dead zone" exists between adjacent detent grooves 272 where the engagement end of the detent 280 rides on the outer surface 268 of the head housing 266 and no camming effects assist aligning detent groove 272 and detent 280. To provide haptic feedback to a user when the detent 280 is suitably aligned with any detent groove 272, the head housing 266 is provided with a series of secondary detent grooves 282. These secondary detent grooves 282 are preferably a wide shallow "U" shape and are sized and positioned with minimal or no "dead zone" between adjacent grooves. Referring now to FIG. 15, the detent grooves 282 are respectively engaged by a protrusion 290 of the side wall 292 of the handle to provide haptic feedback of any correctly aligned predetermined pivotal position.

While various embodiments have been described above it should be understood that they have been presented by way of example only, and not limitation. For instance, modifications or changes as can be made within the scope of the attached claims and features disclosed in connection with any one embodiment can be used alone or in combination with each feature of the respective other embodiments. Thus, the breadth and scope of any embodiment should not be limited by any of the above-described exemplary embodiments but should be defined only in accordance with the following claims and their equivalents.

What is claimed is:

1. A hair trimmer, comprising:

a handle housing having a pivotal head pivotally mounted thereto and being pivotal about a pivot axis defined by axles of a head housing of the pivotal head being received in journals of the handle housing; the head housing of the pivotal head further supporting a fixed blade and a moving blade, reciprocal relative to the fixed blade in a direction parallel to the pivot axis; the head housing of the pivotal head further including a plurality of detent grooves radially arranged around the pivot axis and extending axially along an outer surface portion of the head housing of the pivotal head;

a locking button mounted to the handle housing and slidable along the handle housing in a length direction of the handle housing between a first position wherein pivoting of the pivotal head relative to the handle housing is locked, and a second position wherein the pivotal head is manually pivotal relative to the handle housing; the locking button being biased towards the first position, the locking button further comprising a depending wall and a cam surface;

a detent extending between an engagement end of the detent and a cam end of the detent and having therebetween a detent slot, the engagement end being receivable in any one of the plurality of detent grooves to define a predetermined pivotal position of the pivotal head relative to the handle housing; and a biasing element including an inner biasing portion that acts against the depending wall of the locking button to bias the locking button to the first position, and an outer biasing portion received in the detent slot to bias the engagement end of the detent in a direction into the respective one of the plurality of detent grooves;

wherein, when the locking button is in the first position, the cam surface of the locking button abuts the cam end of the detent to retain the engagement end of the detent in the respective one of the plurality of detent grooves of the head housing of the pivotal head to lock pivotal movement of the pivotal head; and when the locking button is in the second position, the cam surface of the locking button is retracted relative to the cam end of the detent to permit the detent to move away from the head housing of the pivotal head to release the engagement end of the detent from the respective one of the plurality of detent grooves, thereby permitting the pivotal head to be pivoted relative to the handle housing.

2. The hair trimmer of claim 1, wherein the plurality of detent grooves are equally disposed radially around the pivot axis.

3. The hair trimmer of claim 1, wherein the plurality of detent grooves comprises six grooves.

4. The hair trimmer of claim 1, wherein the biasing element is a compound leaf spring having a bifurcated outer leaf and a bifurcated inner leaf secured within the bifurcated outer leaf; the bifurcated inner leaf having an inner base portion and the inner biasing portion; the bifurcated outer leaf having an outer base portion and the outer biasing portion; the inner base portion of the bifurcated inner leaf overlaying the outer base portion of the bifurcated outer leaf.

5. The hair trimmer of claim 1, wherein the outer biasing portion of the biasing element is provided with one or more cantilever arms at lateral outer portions of the outer biasing portion.

6. The hair trimmer of claim 5, wherein the locking button is further provided with an elevation surface that engages the one or more cantilever arms of the outer biasing portion.

7. The hair trimmer claim 1, wherein the biasing element is snap-fittingly secured within the handle housing by a protrusion of a support wall of the handle housing engaging an elongated slot of the outer base portion of the biasing element.

8. The hair trimmer of claim 1, wherein the locking button has mirrored legs that respectively snap fittingly engage elongated slots of the handle housing to retain the locking button to the handle housing; the elongated slots being elongated along a general length direction of the handle housing to allow the locking button to be slidable in the length direction.

9. The hair trimmer of claim 1, wherein the detent grooves are primary detent grooves, and the head housing of the pivotal head further includes a plurality of secondary detent grooves.

10. The hair trimmer of claim 9, wherein the secondary detent grooves are respectively engaged by a protrusion of a side wall of the handle housing to provide haptic feedback to a user.

11. A biasing element for a hair trimmer, comprising:

a compound leaf spring having a bifurcated outer leaf and a bifurcated inner leaf secured within the bifurcated outer leaf;

the bifurcated inner leaf having an inner base portion and an inner biasing portion;

the bifurcated outer leaf having an outer base portion and an outer biasing portion;

wherein in its assembled condition, the base portion of the inner leaf overlays the base portion of the outer leaf; and wherein the outer biasing portion of the bifurcated outer leaf is provided one or more cantilever arms at lateral outer portions of the outer biasing portion.

12. The biasing element of claim 11, wherein the inner biasing portion is adapted to engage a locking button of the hair trimmer, wherein the inner biasing portion is adapted to provide a biasing force on the locking button, wherein the outer biasing portion is adapted to engage a detent of the hair trimmer, wherein the outer biasing portion is adapted to provide a biasing force for the detent that is one of the same and different to the biasing force for the locking button.

13. The biasing element of claim 11, wherein the inner leaf has a protrusion that snap-fittingly engages an opening of the outer leaf to secure the inner leaf within the outer leaf.

14. The biasing element of claim 11, wherein both of the inner leaf and the outer leaf are made from a sheet material and the inner leaf has a different thickness than the outer leaf.

15. A biasing element for a hair trimmer, comprising:

a compound leaf spring having a bifurcated outer leaf and a bifurcated inner leaf secured within the bifurcated outer leaf;

the bifurcated inner leaf having an inner base portion and an inner biasing portion;

the bifurcated outer leaf having an outer base portion and an outer biasing portion;

wherein in its assembled condition, the base portion of the inner leaf overlays the base portion of the outer leaf; and wherein the inner leaf has a protrusion that snap-fittingly engages an opening of the outer leaf to secure the inner leaf within the outer leaf.

16. The biasing element of claim 15, wherein the inner biasing portion is adapted to engage a locking button of the hair trimmer, wherein the inner biasing portion is adapted to provide a biasing force on the locking button, wherein the outer biasing portion is adapted to engage a detent of the hair trimmer, wherein the outer biasing portion is adapted to provide a biasing force for the detent that is one of the same and different to the biasing force for the locking button.

17. The biasing element of claim 15, wherein the outer biasing portion of the bifurcated outer leaf is provided one or more cantilever arms at lateral outer portions of the outer biasing portion.

18. The biasing element of claim 15, wherein both of the inner leaf and the outer leaf are made from a sheet material and the inner leaf has a different thickness than the outer leaf.

* * * * *